United States Patent
Cevher et al.

(10) Patent No.: US 8,379,485 B2
(45) Date of Patent: Feb. 19, 2013

(54) COMPRESSIVE SENSING SYSTEM AND METHOD FOR BEARING ESTIMATION OF SPARSE SOURCES IN THE ANGLE DOMAIN

(75) Inventors: Volkan Cevher, Houston, TX (US); Ali Cafer Gurbuz, Marietta, GA (US); James H. McClellan, Chamblee, GA (US); Ramalingam Chellappa, Potomac, MD (US)

(73) Assignees: University of Maryland, College Park, MD (US); Georgia Tech Research Corporation, Atlanta, GA (US)

( * ) Notice: Subject to any disclaimer, the term of this patent is extended or adjusted under 35 U.S.C. 154(b) by 281 days.

(21) Appl. No.: 12/740,947
(22) PCT Filed: Nov. 3, 2008
(86) PCT No.: PCT/US2008/082210
§ 371 (c)(1), (2), (4) Date: Apr. 30, 2010
(87) PCT Pub. No.: WO2009/059279
PCT Pub. Date: May 7, 2009

(65) Prior Publication Data
US 2010/0265799 A1   Oct. 21, 2010

Related U.S. Application Data

(60) Provisional application No. 60/984,439, filed on Nov. 1, 2007.

(51) Int. Cl.
*G01S 3/80* (2006.01)
(52) U.S. Cl. ........................................ 367/128
(58) Field of Classification Search .............. 367/128
See application file for complete search history.

(56) References Cited

U.S. PATENT DOCUMENTS

| | | | |
|---|---|---|---|
| 5,495,256 A * | 2/1996 | Piper | 342/195 |
| 6,993,440 B2 * | 1/2006 | Anderson et al. | 702/66 |
| 7,187,326 B2 * | 3/2007 | Beadle et al. | 342/451 |
| 2003/0065262 A1 * | 4/2003 | Stergiopoulos et al. | 600/437 |
| 2007/0230269 A1 | 10/2007 | Ledeczi et al. | |

OTHER PUBLICATIONS

V. Cevher, M. F. Duarte, and R. Baraniuk; "Distributed Target Localization Via Spatial Sparsity", Proc. of 16th European Signal Processing Conf. 2008. 5 pages.*

Marco F. Duarte, Michael B. Wakin, Dror Baron, and Richard G. Baraniuk. 2006. Universal distributed sensing via random projections. In Proceedings of the 5th international conference on Information processing in sensor networks (IPSN '06). ACM, New York, NY, USA, 177-185.*

(Continued)

*Primary Examiner* — Isam Alsomiri
*Assistant Examiner* — James Hulka
(74) *Attorney, Agent, or Firm* — Carter, DeLuca, Farrell & Schmidt, LLP (57) ABSTRACT

Compressive Sensing (CS) is an emerging area which uses a relatively small number of non-traditional samples in the form of randomized projections to reconstruct sparse or compressible signals. Direction-of-arrival (DOA) estimation is performed with an array of sensors using CS. Using random projections of the sensor data, along with a full waveform recording on one reference sensor, a sparse angle space scenario can be reconstructed, giving the number of sources and their DOA's. Signal processing algorithms are also developed and described herein for randomly deployable wireless sensor arrays that are severely constrained in communication bandwidth. There is a focus on the acoustic bearing estimation problem and it is shown that when the target bearings are modeled as a sparse vector in the angle space, functions of the low dimensional random projections of the microphone signals can be used to determine multiple source bearings as a solution of an l]-norm minimization problem.

22 Claims, 8 Drawing Sheets

OTHER PUBLICATIONS

Marco F Duarte, Yu Hen Hu., "Vehicle classification in distributed sensor networks". Journal of Parallel and Distributed Computing vol. 64, Issue 7, Jul. 2004, pp. 826-838.*

Cevher, V.; Gurbuz, A.C.; McClellan, J.H.; Chellappa, R.; , "Compressive wireless arrays for bearing estimation," Acoustics, Speech and Signal Processing, 2008. ICASSP 2008. IEEE International Conference on , vol., No., pp. 2497-2500, Mar. 31, 2008-Apr. 4, 2008.*

PCT International Preliminary Report on Patentability dated May 4, 2010 for PCT/US2008/082210.

* cited by examiner

COMPRESSIVE SENSING SYSTEM AND METHOD FOR BEARING ESTIMATION OF SPARSE SOURCES IN THE ANGLE DOMAIN

PRIORITY

The present application claims priority from a United States provisional application filed on Nov. 1, 2007 titled "Compressive Wireless Arrays for Bearing Estimation" and assigned U.S. Provisional Application Ser. No. 60/984,439; the entire contents of which are incorporated herein by reference.

GOVERNMENT RIGHTS

This invention was made with Government support under ARO Contract DAAD190120008. The Government has certain rights in the invention.

BACKGROUND

Joint processing of sensor array outputs improves the performance of parameter estimation and hypothesis testing problems beyond the sum of the individual sensor processing results. To realize the gains from the joint processing of array outputs, arrays are often tethered since the output data from each sensor in the array generally requires a high bandwidth for transmission. When this transmission is achieved in a wireless setting, the sensor batteries can be quickly depleted and array elements may cause communication interference among themselves as they send relatively large data packets. Compared to wireless proximity sensors, arrays are harder to set up and deploy. In addition, wired arrays tend to have relatively small apertures as unattended ground sensors (UGS), diminishing their main advantage derived from aperture gains. Hence, there is a clear need for a wireless design for arrays to overcome the disadvantages of the tethered array designs to further push the frontiers of what is achievable by sensor networks.

SUMMARY

The present disclosure provides a system having a compressive wireless array for two-dimensional bearing estimation of multiple acoustic sources with a plurality of sensors using a wireless channel under bandwidth constraints. The recent results in compressive sensing theory are employed, which state that exact recovery of sparse sources may be obtained with high probability from highly under-sampled data in the Nyquist-Shannon sense. The present disclosure demonstrates the feasibility of wireless arrays for bearing estimation when low dimensional random projections of the signals from (possibly randomly) distributed single microphone sensors are used as inter-sensor messages over the communication channel. The target bearings are treated as a sparse vector in a discretized bearing space.

For acoustic bearing estimation, it is assumed that the individual sensor locations are known a priori; however, the number of sources is not assumed. When the source signals are unknown but incoherent, the present disclosure shows that the high-rate samplers can be eliminated from all but one of the array elements by using a constrained convex optimization algorithm to perform the bearing estimation calculation. To favor sparsity of target bearings $l_1$-norm minimization with the Dantzig selector as a proxy to a combinatorial optimization is used.

The compressive bearing estimation approach in accordance with the present disclosure based on $l_1$ minimization is substantially different from approaches in the literature, such as generalized cross correlation (GCC), minimum variance distortionless response (MVDR), and multiple signal classification (MUSIC) which require Nyquist sampling at the sensors. In addition, there are no Gaussian source assumptions, such as GCC, nor any assumptions about the source signals being narrow or wideband, such as MVDR and MUSIC.

In the literature, there are other convex optimization approaches to determine multiple sources DOA's, based on regularization. However, the common theme of these methods is that they still require Nyquist-rate sampling, followed by conventional beamforming at a small number of angles. Regularized construction on the angle space is then done to constrain the calculation of the conventional beamformer output.

The method according to the present disclosure is fundamentally different in many ways from the earlier works for wireless arrays and compressive wireless sensing. In one earlier work described in J. Chen, L. Yip, J. Elson, H. Wang, D. Maniezzo, R. Hudson, K. Yao, and D. Estrin, "Coherent acoustic array processing and localization on wireless sensor networks," Proceedings of the IEEE, vol. 91, no. 8, pp. 1154-1162, 2003, the authors use audio codes and compression techniques to send the full individual sensor acoustic data to a cluster head, which in turn determines source bearings using the maximum likelihood (ML) and least squares (LS) methods.

In W. Bajwa, J. Haupt, A. Sayeed, and R. Nowak, "Compressive wireless sensing," in IPSN, 2006, pp. 134-142, power-distortion-latency trade-offs are given for a compressive sensing scheme for sensor networks, which employs the compressive sensing framework as a universal encoding scheme to send and recover signals from multiple distributed sensors. When compared to these earlier works, the compressive wireless array approach according to the present disclosure provides a wireless sensing strategy to directly determine a sparse bearing vector in the angle domain by exploiting the redundancies in the sensor signals for the bearing estimation problem.

The present disclosure provides many advantages such as the following:
1. It provides a bearing estimation algorithm which uses very small number of samples. The algorithm is very suitable for wireless arrays with communication constraints.
2. It provides 3D bearing estimates in azimuth and elevation angles.
3. It provides long battery life to the sensors since most battery power is consumed in communicating between sensors. Since the compressive samples are the minimum number of data samples required to reconstruct the bearing vector in the angle domain, the approach according to the present disclosure uses minimum possible communication bandwidth among the sensors which would yield very long battery life. Field data results are shown where only 10 bits of information is passed from each microphone to estimate multiple target bearings.
4. It provides less clutter since sparse solutions are favored in the method described herein. The method chooses the best combination of bearings with smallest number of bearings that explains the measured data.
5. It provides nulling a jammer which has possibly much higher power than the target of interest.
6. It can be used with wired arrays reducing the A/D load on the sensors which is very important in applications like radar or radio astronomy where taking samples are very expensive. As an example, the Allen Telescope Array northeast of San Francisco has a frequency coverage from 0.5 to 11.2 GHz for scientific studies. The method described herein uses very small set of informative measurements that allow estimation of DOA's. The samples are not needed to be taken at the Nyquist rate but rather the "information" rate of the signal.

7. The sensor positions can be totally random giving the flexibility of easy deployment. A case is envisioned where the sensors are thrown out to the field randomly. After calibration they start bearing estimation passing very small amount of data within the network.
8. It results in aperture gains when the aperture size increases with the same number of sensors, the bearing resolution of the arrays increase, allowing the two targets to be separated. This separation is even clear, when only one bit is used for each compressive sample.
9. It results in a quite robust wireless array scheme against noise in the compressive samples and can even operate when only the zero crossing information of the compressive samples is passed.

These and other advantages are described herein with reference to the drawings and the detailed description which follows.

DETAILED DESCRIPTION

I. Compressive Beamforming Method

1. Introduction

The problem of direction-of-arrival (DOA) estimation is extensively studied in array signal processing, sensor networks, remote sensing, etc. To determine a DOA using multiple sensors, generalized cross correlation (GCC), minimum variance distortionless response (MVDR), and multiple signal classification (MUSIC) algorithms are commonly used. By construction, all of these methods require Nyquist-rate sampling of received signals to estimate a small number of DOA's in angle space, which is very expensive in some applications such as radar or radio astronomy. As an example, the Allen Telescope Array northeast of San Francisco has a frequency coverage from 0.5 to 11.2 GHz for scientific studies. In the present disclosure, a method is presented that takes a very small set of informative measurements that still allow one to estimate DOA's.

Recent results in Compressive Sensing (CS) (see, e.g., The recent results in compressive sensing are described in R. G. Baraniuk, "Compressive Sensing," *IEEE Signal Processing Magazine*, vol. 24, no. 4, pp. 118-121, 2007) state that it is possible to reconstruct a K-sparse signal x=Ψs of length N from O(K log N) measurements. CS takes non-traditional linear measurements, y=Φx, in the form of randomized projections. A signal x, which has a sparse representation in a transform domain Ψ, can be reconstructed from $M=C(\mu^2(\Phi, \Psi)\log N)$ K compressive measurement exactly with high probability by solving a convex optimization problem of the following form $$\min \|x\|_1, \text{ subject to } y=\Phi\Psi x. \quad (1)$$

which can be solved efficiently with linear programming.

A basis-pursuit strategy is used to formulate the DOA estimation problem as a dictionary selection problem where the dictionary entries are produced by discretizing the angle space and then synthesizing the sensor signals for each discrete angle. Sparseness in angle space implies that only a few of the dictionary entries will be needed to match the measurements. According to the results of CS, it should be possible to reconstruct the sparse dictionary-selector vector from M compressive measurements. Compressive measurements (random projections) of the angle space vector are not taken directly. Instead, random projections of the received signals are taken at the sensors; there is a model for these as delayed and weighted combinations of multiple source signals coming from different angles.

When the source signals are known, e.g., in active radar, it is possible to directly create the dictionary entries by delaying the known reference signals. When the source signals are unknown and incoherent, the high-rate samplers from all but one of the array elements can be eliminated by using CS to perform the beamforming calculation. One sensor must be devoted to acquiring a reference signal, and this operation must be done at a high rate, i.e., Nyquist-rate sampling; the other sensors only need to do compressive sensing. By using the data from the reference sensor, it is shown that one can relate the compressive measurements at all other sensors to the angle space vector θ linearly, because it is assumed that the locations of the sensors with respect to the reference sensor are known. This enables one to find the sparse dictionary selector vector by solving an $l_1$ minimization problem, which is detailed in Section 2.

The compressive beamforming approach in accordance with the present disclosure which is based on $l_1$ minimization is substantially different from approaches in the literature, such as GCC, MVDR, and MUSIC which require Nyquist sampling at the sensors. In addition, the CS beamforming approach does not have Gaussian source assumptions, such as GCC, nor have any assumptions about the source signals being narrow or wideband, such as MVDR and MUSIC. In the literature, there are other convex optimization approaches to determine multiple source DOA's, based on regularization. However, the common theme of these methods is that they still require Nyquist-rate sampling, followed by conventional beamforming at a small number of angles. Regularized construction on the angle space is then done to constrain the calculation of the conventional beamformer output.

2. Theory: CS for DOA Estimation

Cases are considered where the source signal is known or unknown, as well as cases with one source, multiple sources, and additive noise.

2.1. DOA Estimation of a Known Source Signal

Assume that one knows the source signal s(t) and wants to determine the DOA of this source, using an array of L sensors with an arbitrary geometry. The sensor positions are assumed known and are given by $\eta_i=[x_i, y_i, z_i]^T$. When the source is in the far-field of the array, sensor i simply receives a time-delayed and attenuated version of this source $$\zeta_i(t)=ws(t+\Delta_i(\pi_S)-R/c), \quad (2)$$

where w is the attenuation, $\pi_S=(\theta_S, \Phi_S)$ is the angle pair consisting of the unknown azimuth and elevation angles of the source, R is the range to the source, and $\Delta_i(\pi_S)$ is the relative time delay (or advance) at the i-th sensor for a source with bearing $\pi_S$ with respect to the origin of the array.

Finding the DOA is equivalent to finding the relative time delay, so one ignores the attenuation and assume that the R/c term is known, or constant across the array. The time delay $\Delta_i$ in (2) can be determined from geometry:

$$\Delta_i(\pi_S) = 1/c \eta_i^T \begin{bmatrix} \cos\theta_S \sin\Phi_S \\ \sin\theta_S \sin\Phi_S \\ \cos\Phi_S \end{bmatrix}, \quad (3)$$

where c is the speed of the propagating wave in the medium.

The source angle pair $\pi_S$ lies in the product of space $[0, 2\pi)_\theta \times [0, \pi)_\Phi$, which must be discretized to form the angle dictionary, i.e., one enumerates a finite set of angles for both to azimuth and elevation to generate the set of angle pairs $\beta=\{\pi_1, \pi_2, \ldots, \pi_N\}$, where N determines the resolution. Let b denote the sparsity pattern which selects members of the discretized angle-pair set $\beta$, i.e., a non-zero positive value at index j of b selects a target at the az-el pair for $\pi_j$. When there is only one source, one expects the sparsity pattern vector b to have only one non-zero entry, i.e., maximal sparseness.

One can relate the bearing sparsity pattern vector b linearly to the received signal vector at the i-th sensor as follows:

$$\zeta_i=\Psi_i b, \quad (4)$$

$$\zeta_i=[\zeta_i(t_O), \zeta_i(t_O+1/F_S), \ldots, \zeta_i(t_O+((N_t-1)/F_S))]^T, \quad (5)$$

where $F_S$ is the sampling frequency, $t_O$ is the appropriate initial time, and $N_t$ is the number of data samples. In (4), the j-th column of $\Psi$ corresponds to the time shift of the source signal $_s(t)$ corresponding to the j-th index of the sparsity pattern vector b, which indicates the proper time shift corresponding to the angle pair $\pi_j$:

$$[\Psi_i]_j=+[s(t'_0+\Delta_i(\pi_j)), \ldots, s(t'_{K-1}+\Delta_i(\pi_j))]^T, \quad (6)$$

where t'=t−R/c. The matrix $\Psi_i$ is the dictionary (or, sparsity basis) corresponding to all discretized angle pairs $\beta$ at the i-th sensor.

In CS, rather than sampling $\zeta_i$ at its Nyquist rate, which would enable recovery of s(t), one measures linear projections with M random vectors which can be written in matrix form for the i-th sensor:

$$\beta_i=\Phi_i \zeta_i=\Phi_i \Psi_i b, \quad (7)$$

where $\Phi_i$ is an $M \times N_t$ matrix, whose rows are random vectors selected to have minimum mutual correlation with $\Phi_i$. Then the sparsity pattern vector b can be found from the set of compressive samples from all the sensors $\beta_{i=1:L}$, by the solving the following $l_1$ minimization problem:

$$\text{vector } b=\arg\min \|b\|_1 \text{ subject to } Ab=\beta, \quad (8)$$

where $\beta=[\beta^T_1, \ldots, \beta^T_L]^T$, and $A=\Phi\Psi$ with $\Psi=[\Psi^T_1, \ldots, \Psi^T_L]^T$, and $\Phi$ the block diagonal matrix of size $LM \times LN_t$ formed with the $\Phi_i$'s along its diagonal.

2.2. DOA Estimation of an Unknown Source Signal

In passive sensing problems, the source signal s(t) is not known and is often estimated jointly with the source angle pair $\pi_S$. When s(t) is unknown, one cannot construct $\Psi$ in the $l_1$ minimization problem (8) to determine the sparsity pattern vector b. One alternative is to use the received signal at one sensor (sampled at the Nyquist rate) as the presumed source signal; the rest of the sensors can still collect the compressive samples. This sensor is called the reference sensor (RS).

The reference sensor records the signal $\zeta_O(t)$ at a high sampling rate. One can calculate the time shift for sensor i with respect to the RS using equation 5. Thus, the data at sensor i for an unknown source at bearing $\pi_S$ is $\zeta_i(t)=\zeta_O(t+\Delta_i(\pi_S))$. The sparsity basis matrix $\Psi_i$ for sensor i can be constructed using proper shifts of $\zeta_O(t)$ for each $\pi_j$ in $\beta$. Hence, not knowing the source signal incurs a cost of Nyquist rate sampling at one of the sensors, but high data sampling rates from the rest of the array elements are still avoided.

2.3. Effects of Additive Sensor Noises

In general, the i-th sensor receives a noisy version of the RS signal (or the source signal) as $\zeta_i(t)=\zeta_O(t+\Delta_i(\theta_S,\Phi_S))+n_i(t)$. Then the compressive measurements $\beta_i$ at the i-th sensor have the following form:

$$\beta_i=\Phi_i \zeta_i=\Phi_i \Psi_i b+u_i \quad (9)$$

where $u_i=\Phi_i n_i \sim N(0,\sigma^2)$ and $n_i$ is the concatenation of the noise samples at the sensor i, which is assumed to be $N(O, \sigma^2_n)$. Since $\Phi_i$ is deterministic, then one has $\sigma^2=(\Sigma^{Ns}_{n=i} \Phi^2_{il}) \sigma^2_n$. Hence, if the norm of the $\Phi_i$ vectors is constrained to be one, then $\sigma^2=\sigma^2_n$.

With the construction of $\beta$ and A in Section 2.1, the sparsity pattern vector b can be recovered using the Dantzig selector convex optimization problem:

$$\text{vector } b=\arg\min \|b\|_1 \text{ s.t. } \|A^T(\beta-Ab)\|_\infty < \epsilon N\sigma. \quad (10)$$

Selecting $\epsilon N=\sqrt{2 \log N}$ makes the true b feasible with high probability. The optimization problems in equations 8 and 10 both minimize convex functionals, a global optimum is guaranteed.

2.4. DOA Estimation of Multiple Unknown Sources

Now assume there is another source $s_2(t)$ impinging on the array at the bearing $\pi_2$. If $s_2(t)$ is non-coherent with $s_1(t)$ one can show that its effect is similar to additive noise when looking in the direction of the first source signal. In order to show that this additive noise behavior is a correct interpretation, the constraint in equation 10 is examined which yields a sparse solution for b even in the presence of noise.

The recorded RS signal is $$\zeta_O(t)=s_1(t)+s_2(t) \quad (11)$$

assuming equal amplitude signals. The shifted RS signal at the i-th sensor is $$\zeta_O(t+\Delta_i(\pi_n))=s_1(t+\Delta_i(\pi_n))+s_2(t+\Delta_i(\pi_n)) \quad (12)$$

when the assumed bearing is $\pi_n$, and this signal is used to populate the n-th column of the A matrix. On the other hand, the true received signal at the i-th sensor is $$\zeta_i(t)=s_1(t+\Delta_i(\pi_1))+s_2(t+\Delta_i(\pi_2)) \quad (13)$$

where there are different time shifts for the two signals.

The terms in the Dantzig Selector (10) constraint, $A^T\beta$ and $A^T A$ are actually auto- and cross-correlations. For $A^T\beta$ a column vector is obtained whose n-th element is $$R_{11}(\Delta_i(\pi_n),\Delta(\pi_1))+R_{12}(\Delta_i(\pi_n),\Delta(\pi_2))+ \quad (14)$$

$$R_{12}(\Delta_i(\pi_n),\Delta(\pi_1))+R_{22}(\Delta_i(\pi_n),\Delta(\pi_2)) \quad (15)$$

where $R_{11}$ is the autocorrelation of signal $s_1(t)$, $R_{22}$ the autocorrelation of $s_2(t)$, and $R_{12}$ the cross-correlation. For the matrix $A^T A$, the element in the n-th row and r-th column is $$R_{11}(\Delta_i(\pi_n),\Delta(\pi_r))+R_{12}(\Delta_i(\pi_n),\Delta(\pi_r))+ \quad (16)$$

$$R_{12}(\Delta_i(\pi_n),\Delta(\pi_r))+R_{22}(\Delta_i(\pi_n),\Delta(\pi_r)) \quad (17)$$

Two assumptions are made: first, that the cross correlation is small—this is the incoherence assumption; second, that the signals de-correlate at small lags, i.e., the autocorrelations are peaked at zero lag. Then the constraint in equation 10 is examined, and it is observed that in order to make $A^T\beta - A^T Ab$ small one should make sure that the large elements in the vector $A^T\beta$ are cancelled by the large terms in $A^T Ab$. With these assumptions, the two largest elements in $A^T\beta$ occur when $\pi_n=\pi_1$ and $\pi_n=\pi_2$, because these are cases where there are peaks in the autocorrelations, i.e., $R_{11}(\Delta_i(\pi_1),\Delta(\pi_1))$ and $R_{22}(\Delta_i(\pi_2),\Delta(\pi_2))$. When one cancels the element $R_{11}(\Delta_i(\pi_1),\Delta(\pi_1))$, the row of $A^T Ab$ corresponding to $\pi_n=\pi_1$ is used, so the vector b must select the column where $\pi_r=\pi_1$. Likewise, to cancel the element $R_{22}(\Delta_i(\pi_2),\Delta(\pi_2))$, the it, $\pi_n=\pi_2$ row and the $\pi_r=\pi_2$ column are used. The assumptions say that all the other elements will be relatively small.

The bottom line of this analysis is that the Dantzig Selector constraint, with a well-chosen $\epsilon$, will allow the matching of the two signals at their true bearings. Then the $l_1$ minimization of the selector vector b will tend to pick the signals whose autocorrelation is large. The preceding analysis can be modified for the case where the signals have different amplitudes, but when the relative amplitudes become too different one expects that the $l_1$ minimization would pick the larger of the two.

Figure 1:
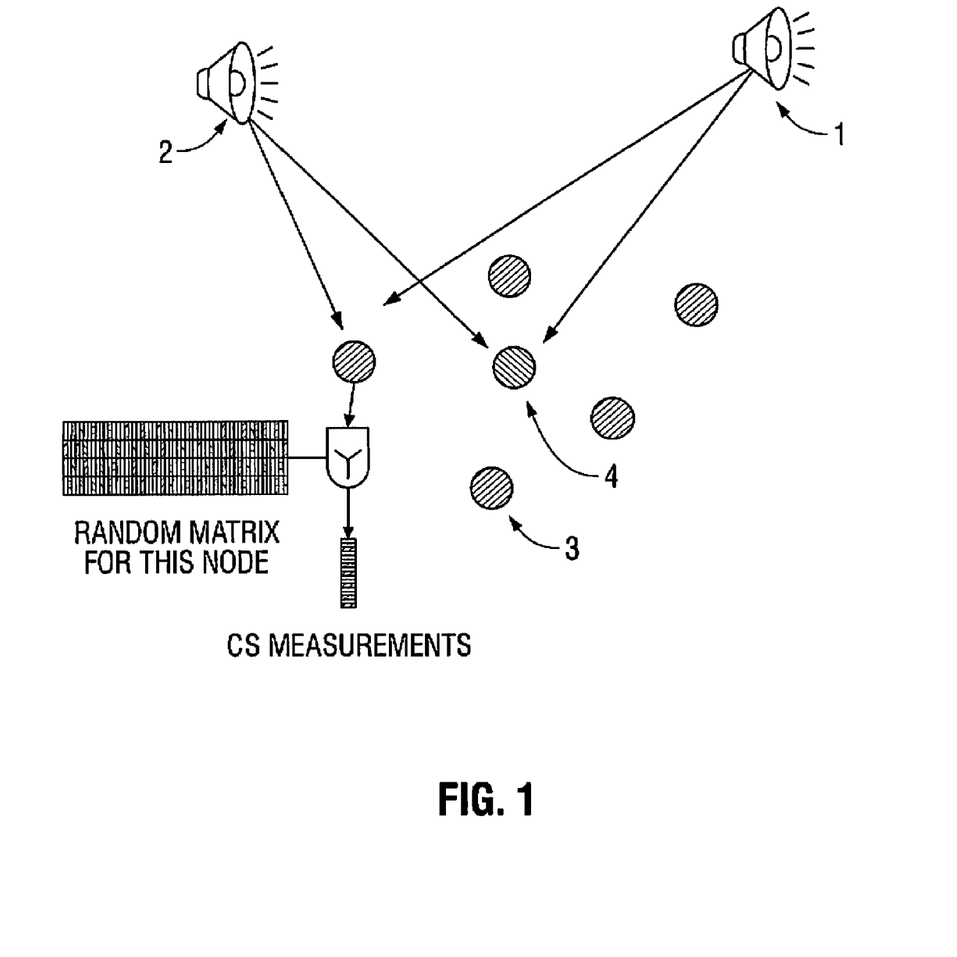
FIG. 1 illustrates a sensor setup for compressive beamforming in accordance with the present disclosure.

This same reasoning can be extended to the case with P unknown sources at bearings $(\theta_1,\Phi_1), (\theta_2,\Phi_2), \ldots, (\theta_P,\Phi_P)$, impinging on the array of sources. A possible scenario in accordance with the present disclosure is shown in FIG. 1 having two signal sources 1 and 2, at least one compressive sensor 3, at least one reference sensor 4. Sensor i receives a delayed combination of source signals as $$\zeta_i(t) = \sum_{P=1}^{P} s(t + \Delta_i(\theta s, \Phi s)) + n_I(t). \quad (18)$$

If the non-coherency between sources is satisfied then one can extend the two-source analysis above to the P source case, and claim that the Dantzig Selector constraint will favor the correct source bearings. Thus, the $l_1$ minimization problem in equation 10 will reconstruct the appropriate selector vector b from one RS signal and L−1 compressed sensor outputs.

3. Simulations

Finally, a test example is shown to illustrate the ideas presented in the previous section.

Figure 2A:
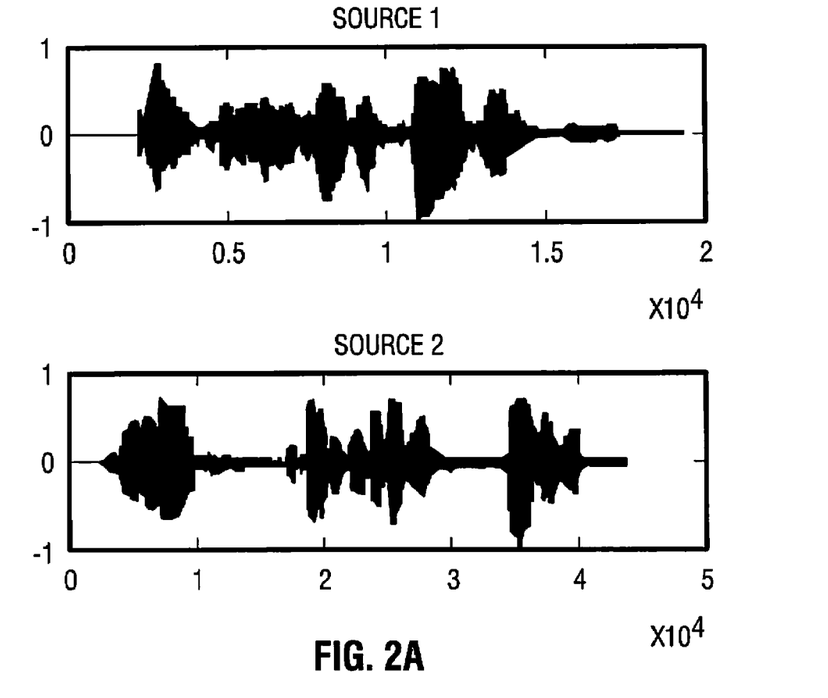
FIGS. 2(a)-(d) illustrate (a) source signals, (b) noisy compressive measurements from all sensors, (c) MVDR result, and (d) compressive (CM) beamformer output indicative of a test example described herein.

Two synthetic speech sources are taken and placed in the far field of a linear array of 11 sensors placed on the x-axis uniformly with 0.25 m spacing. The middle sensor is selected as the reference sensor which is taken to be at the origin. The two sources are placed at angles 33° and 78°. The two sources are WAV files that one assumes are unknown. The first source reads "Houston we have a problem," and the second reads "Remember. The force will be with you. Always." The source signals used in the simulation are shown in FIG. 2(a). The RS signal is the sum of the two source signals.

Figure 2B:
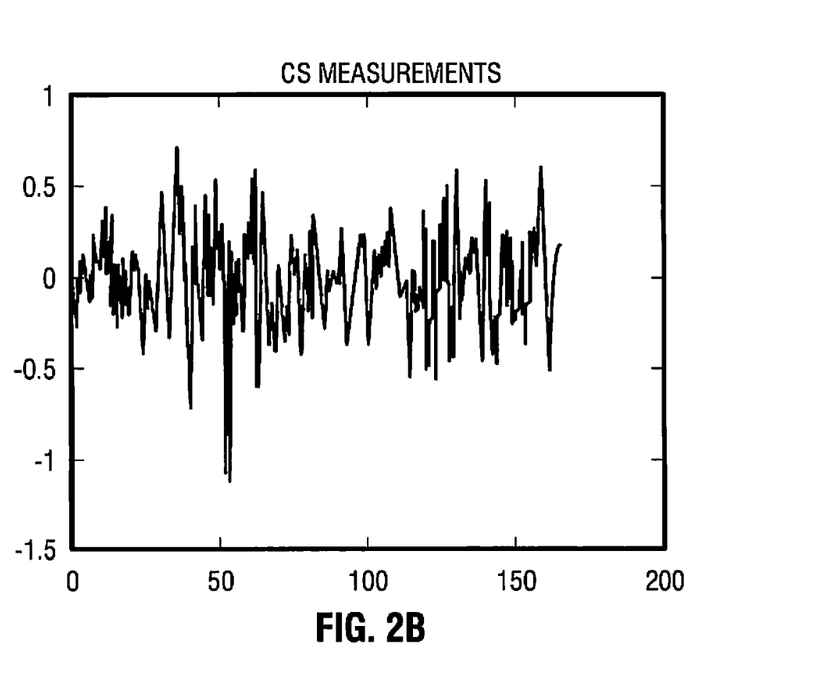

Segments of length $N_t=8000$ are extracted from the source signals with $t_0=5000$ to be used in the processing. Each sensor takes only 15 compressive measurements which makes a total of 165 measurements. Therefore, the total measurement number is much less than the standard time sample numbers of the signals, $N_t$. This is because one is not trying to reconstruct the signals. DOAs are only reconstructed in $\theta$ space, which has a resolution of 1° and length of 181 for this example. The entries of the random measurement matrices for each sensor is drawn randomly from N(0,1) independently. WGN is added to the compressive measurements with signal-to-noise ratio (SNR) equals 10 dB. FIG. 2(b) shows the compressive measurements, y, from all sensors. These measurements are the only information known about the sources along with the RS data. For the Dantzig Selector constraint, $\epsilon=3\sqrt{2} \log N\sigma=0.98$ is used for this example. Solution of the $l_1$ minimization problem in equation 10 gives the result in FIG. 2(d).

Figure 2C:
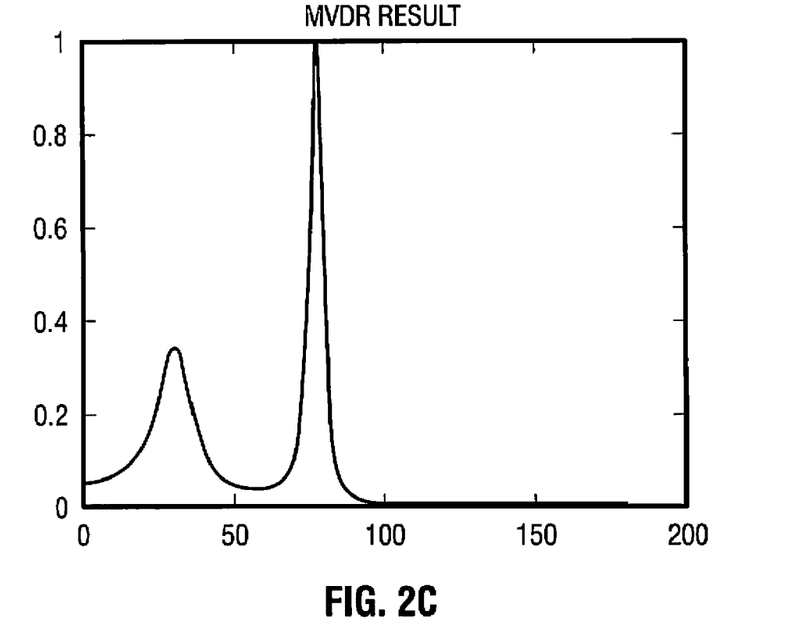
Figure 2D:
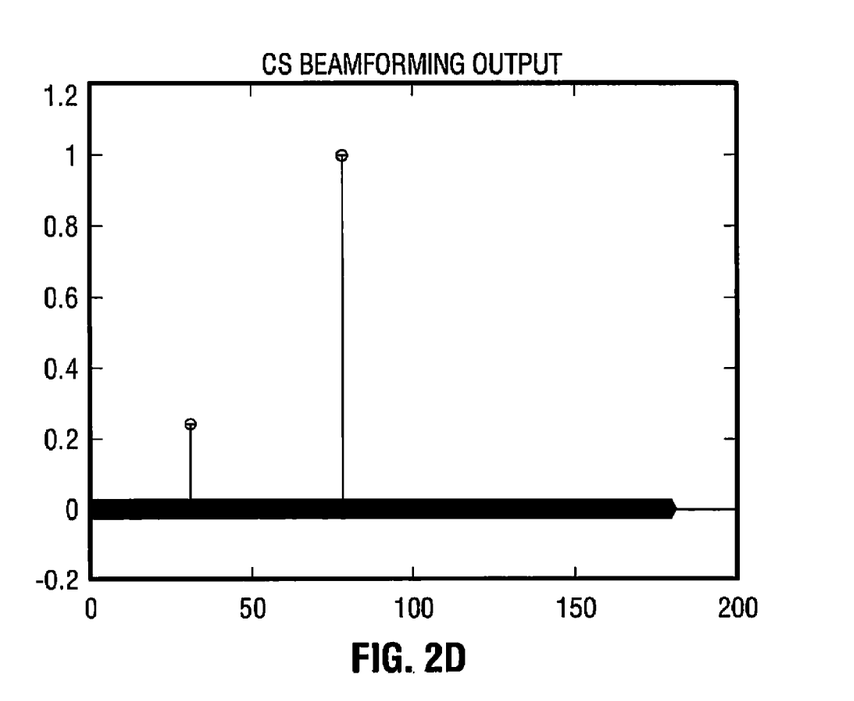

If all the sensors had samples of their received signals at a high sampling frequency one can apply MVDR and one would obtain the response in FIG. 2(c). The MVDR processing is done at f=500 Hz which is a peak in the FFT of the signals. The number of snapshots was 40, and the length of each snapshot 200 samples. Even though the MVDR shows two significant peaks at the true source bearings, a much sparser result was obtained with CS while using many fewer measurements than from standard sampling.

4. Conclusion

The preceding sections provide a compressive beamforming method for using compressive sensing for DOA estimation of multiple targets. The fact that all but one of the array sensors uses compressed measurements reduces the amount of data that must be communicated between sensors. The method has potential in wireless sensor networks where arrays would be formed from distributed sensors.

II. Compressive Wireless Array

1. Introduction

Wireless communication technologies have revolutionized the information gathering and processing systems by enabling a large number of simple sensors to coordinate among themselves to tackle larger sensing problems in a bandwidth constrained and distributed manner. In the quintessential application of target localization, the research trend in the sensor networks literature has subsequently shifted from sensor networks of a small number of bearing-capable arrays to sensor networks of large number of proximity-capable sensors. In contrast, recent results in sensor network design suggest that when constrained with the same budget, a sensor network consisting of only arrays can significantly outperform the average localization performance of the cheaper proximity sensors in spite of their sheer number per capita.

For arrays, array signal processing is used to enhance the signal-to-noise ratio beyond that of a single sensor's output for parameter estimation. To realize the gains from the joint processing of array outputs, arrays are characteristically tethered since the output data from each sensor in the array generally requires a high bandwidth for transmission. When this transmission is achieved in a wireless setting, the sensor batteries can be quickly depleted and array elements may cause communication interference among themselves as they send relatively large data packets. Compared to wireless proximity sensors, arrays are harder to set up and deploy as they require special deployment mechanisms. In addition, because of their wired nature, arrays tend to have relatively small apertures as unattended ground sensors (UGS), diminishing their main advantage derived from aperture gains. Hence, there is a clear need for a wireless design for arrays to overcome the disadvantages of the tethered array designs to further push the frontiers of what is achievable by sensor networks.

In the following sections, the 2D bearing estimation of multiple acoustic sources is discussed with a set of sensors using a wireless channel under bandwidth constraints. Typical examples of sources are sniper fire, human footstep and speech signals, vehicle signals, and chirp signals. The recent results in compressive sensing theory are employed, which state that exact recovery of sparse sources may be obtained with high probability from highly under-sampled data in the Nyquist-Shannon sense. The recent results in compressive sensing are described in R. G. Baraniuk, "Compressive Sensing," *IEEE Signal Processing Magazine*, vol. 24, no. 4, pp. 118-121, 2007.

A signal is called sparse if it contains only a small number of non-zero components within some transform domain. The feasibility of wireless arrays for bearing estimation is demonstrated when low dimensional random projections of the signals from (possibly randomly) distributed single microphone sensors are used as inter-sensor messages over the communication channel.

The target bearings are treated as a sparse vector in a discretized bearing space and apply $l_1$-none minimization with the Dantzig selector as a proxy to a combinatorial optimization problem to obtain multiple source bearings. For acoustic bearing estimation, it is assumed that the individual sensor locations are known a priori; however, the number of sources is not assumed. It is explained below how the array steering matrix for a sparse set of sources in the angle domain is formed for bearing estimation and how the multiple target bearings are calculated using the random projections of the signals from multiple microphones, which constitute the compressive samples of the target bearings. It is noted that these projected samples are used directly to calculate the target bearings without any auxiliary signal reconstruction as they may not recover the microphone signals directly. Possible implementation schemes are given for the proposed wireless system. Although the focus is on bearing estimation with acoustic signals for acoustic surveillance and teleconferencing, the results can be extended for other types of sources.

The approach is fundamentally different in many ways from the earlier works for wireless arrays and compressive wireless sensing. In one earlier work, authors use audio codes and compression techniques to send the full individual sensor acoustic data to a cluster head, which in turn determines source bearings using the maximum likelihood (ML) and least-squares (LS) methods. In another earlier work, power-distortion-latency trade-offs are given for a compressive sensing scheme for sensor networks, which employs the compressive sensing framework as a universal encoding scheme to send and recover signals from multiple distributed sensors.

When compared to the two earlier works mentioned in the preceding paragraph, the compressive wireless array approach according to the present disclosure provides a wireless sensing strategy to directly determine a sparse bearing vector in the angle domain by exploiting the redundancies in the sensor signals for the bearing estimation problem. In the approach described herein, (i) the inter-sensor messages may not recover the original acoustic data sent by a sensor and there is no requirement of any auxiliary signal reconstruction at the processing node in contrast to the two earlier works, (ii) one may not be able to determine the source signals even after determining their bearings, and (iii) the inter-sensor messages require significantly smaller communication bandwidth than the first earlier work and smaller bandwidth than the scheme described in the second earlier work. The ML or LS methods are also not used in obtaining the bearing estimates.

The organization of the following sections is as follows. Section 2 explains the bearing estimation details of the wireless arrays using compressive sampling ideas. Section 3 gives possible implementation and quantization schemes for message passing among the sensors in the communications channel. Section 4 shows field data results to demonstrate the performance and effectiveness of the wireless arrays.

2. Communication Constrained Bearing Estimation of Sparse Sources 2.1. Acoustic Data Observations The bearing estimation of K noncoherent sources in an isotropic medium in the far field of a collection of M sensors with known positions $\zeta_i=[x_i,y_i]'$ ($i=0,\ldots,M-1$) on the ground plane is discussed. The far field of a sensor collection is defined as the boundary of the source region after which the propagating waves appear perceptively planar with respect to the array aperture. For convenience, sensor 0 is called a reference microphone (RM) and is situated at the origin: $\zeta_0=[0,0]'$. It is not assumed that the number of sources K is known.

The received signal is denoted at the RM as $x_O(t)=\Sigma^K_{k=1}s_k(t)+n_O(t)$, which is a superposition of K source signals $s_k(t)$ impinging at bearings $\theta_k$ (measured with respect to the x-axis) and the sensor noise $n_O(t)$. Sensor i observes the time delayed (or advanced) superposition $x_i(t)=\Sigma^K_{k=1}s_k(t+\tau_i(\theta_k))+n_i(t)$ of the source signals plus noise, where the time delay at the ith sensor $\tau_i(\theta)$ of a source at bearing $\theta$ is given by $$\tau_i(\theta) = 1/c\zeta_I \begin{bmatrix} \cos\theta \\ \sin\theta \end{bmatrix}, \tag{19}$$

where c is the speed of sound. The objective according to the present disclosure is to determine the source bearings $\{\theta_1,\ldots,\theta_K\}$ by sending the minimum amount of information possible among the sensors. By determining the minimum information necessary to reconstruct the bearings, the inter-sensor message packet sizes are minimized so that sensor batteries are preserved and inter-sensor communication interference is minimized.

2.2. Compressive Sensing

The source bearings $\theta$ are treated as an unknown vector in $R^N$, where N is the resolution of the (uniformly) discretized bearing space, which resides in $[0, 2\pi)$. An adaptive discretization can be done for focusing purposes. Within the bearing space, the bearings corresponding to the sources have non-zero entries in their respective locations in the discretized bearing space, whose values are to be determined from the problem set up, whereas the zero values simply imply the absence of targets at the corresponding bearings. Hence, the objective source bearings vector according to the present disclosure is modeled with a K-sparse vector in the N-dimensional angle domain (N>>K), whose sparsity pattern is of interest.

Assuming there are digital samples of the source signals corresponding to T seconds, sampled at $F_s$ sampling frequency. Define the kth source vector as a concatenation of these samples:

$$s_k(t_0)=vec\{s_k(t)|t=t_0+m/F_s; m=0,\ldots,[TF_s]-1\}, \tag{20}$$

where $t_0$ is the time origin and [TFs]>N. For convenience, $t_0$ is set to 0 for the rest of the description herein. Then, if one were to sample the observed signal at a sensor i, one would receive $$x_i = [0, \ldots, 0, s_1(\tau_i(\theta_1)), 0, \ldots, 0, s_K(\tau_i(\theta_K)), 0, \ldots] \times \quad (21)$$
$$[0, \ldots, 0, 1, 0, \ldots, 0, 1, 0, \ldots]',$$
$$= \hat{S}_i \theta = S_i \theta,$$

where $\hat{S}_i$: [TFs]×N is the source matrix and $\theta$:N×1 is the objective K-sparse bearings vector. Assuming that the sources are noncoherent (E{$s'_k s_l$}=0, ∀k, l)), one can always replace zero column entries of $S_i$ to make its rank N. Denote one such matrix as $S_i$, where rank ($S_i$)=N.

Compressed sensing decreases the inefficiency of sampling at Fs by directly acquiring a compressed signal representation without going through an intermediate stage of acquiring [TFs] samples. Consider a linear measurement process on the (unobserved) $x_i$ vectors:

$$y_i = \Phi_i x_i = \Phi_i S_i \theta = A_i(\theta)\theta, \quad (22)$$

where $\Phi_i$: L×[TFs] is the measurement matrix and $A_i(\theta)$: L×N is called the source steering matrix. When the source steering matrix satisfies the restricted isometry property (RIP), it is possible to show that $\theta$ can be recovered from L≥αK log N/K measurements where α is a small number. However, note that this requires the knowledge of the source matrix $S_i$, which is not known.

2.3. Estimation of Steering Matrices

Estimates of the source steering matrices can be determined using the RM, which is required to take samples at Fs. The estimate is formed using the delayed versions of the reference signal as follows:

$$\hat{S}_i(\theta) = [x_0(\tau_i((2\pi/N)(0))), \ldots, x_0(\tau_i((2\pi/N)(N-1)))]. \quad (23)$$

Note that when the sought source angle matches the actual source direction, then the columns of the source steering matrix has the maximum correlation, where the other sources act as non-coherent noise samples. When the source steering matrix satisfies the RIP property, it is known that the errors in the sparse vector estimates are well behaved under additive perturbations of the measurements. In Section I above, it is further discussed how each source can be modeled as additive noise in equation 22 and detail the construction of the steering matrices as a basis pursuit strategy.

2.4. Bearing Estimation Problem

Determining $\theta$ has exponential complexity in N as there is a need to search for all the subsets of N, which is a combinatorial problem. To determine the source bearings, one solves the following convex optimization problem at the RM, which serves as a proxy of the combinatorial solution:

$$\theta = \arg\min_\theta \|\theta\|_1 \text{ such that } \|A'(Y - A\theta)\|_\infty \leq \epsilon, \quad (24)$$

where $Y=[y'_1, \ldots, y'_M]'$, $A=\Phi S$, $\Phi=\text{diag}\{\Phi_1, \ldots, \Phi_M\}$, and $\hat{S}=[\hat{S}'_1, \ldots, \hat{S}'_M]'$, and $\epsilon$ is a relaxation variable. To solve for $\theta$, the RM needs the compressive measurements $y_i$ from the other sensors. Note that the samples $y_i$'s are the compressive samples with respect to $\theta$ and not with respect to $x_i$. That is, it may or may not be possible to reconstruct $x_i$ given the measurements $y_i$. For the bearing estimation problem described herein, zero mean Gaussian random variables are used with unit variance to construct the measurement matrix $\Phi$. To solve for $\theta$, the Dantzig selector is used.

3. Implementation Details

It is assumed that the sensor positions are determined by a calibration algorithm, e.g., as described in A. T. Ihler, J. W. Fisher III, R. L. Moses, and A. S. Willsky, "Nonparametric belief propagation for self-calibration in sensor networks," IPSN, 2004, pp. 225-233, ACM Press, New York, N.Y. Since the wireless array aperture is expected to be less than 10 m for all practical purposes with the number of total microphones not exceeding 10-20, all the communications can be made centralized by using orthogonal coding schemes or can be achieved with a small number of hops, and fairly accurate synchronization can be achieved among the sensors. It is assumed that a measurement matrix $\Phi$ is predetermined and each sensor has its knowledge.

For the array hardware, a uniform microphone sensor set is envisioned with wireless communication capabilities, so that each microphone can act as the RM if necessary. With this redundancy, a possible RM bottleneck can be avoided in the future to increase robustness of the system. When a microphone is not acting as the RM, it is in the compressive sensing state to preserve battery and it is called a compressive microphone (CM) in this state. The RM can be chosen randomly; however, it is possible to use heuristics or active self-evaluation methods to choose the best one in some sense. Duties of the RM include: (i) sampling acoustic data $x_o$ at $F_s$, (ii) forming the sparse source steering matrices in equation 23 using the knowledge of the sensor positions, (iii) receiving messages from the CM's and forming the data vector Y and the measurement matrix $\Phi$, and (iv) determining $\theta$ by solving equation 24. These duties stipulate a digital embedded system, which can be done with FPGA's or other digital DSP systems.

Full analog, mixed mode, or full digital implementation can be used for the compressive state, depending on the final power consumption of the implementation. In the full analog implementation, analog mixers can be used to simulate $\Phi$ to obtain the compressive data y in equation 22, followed by a simple zero-crossing detector. In this case, the data messages are y=±1. Surprisingly, it is still possible to obtain bearing estimates from the solution of equation 24 (see Experiments). In the mixed mode implementation, an analog-to-digital (A/D) converter is used to sample the analog mixer output. Different quantization levels can be used. In the full digital implementation, the acoustic data is sampled with an A/D converter, then digitally multiplied with $\Phi$. Special care must be taken in determining the sampling frequency and the quantization levels for this case.

4. Experiments 4.1. Acoustic Field Data Results

A uniform circular acoustic array with 10 microphones (nine microphones on the perimeter with 1.44 meter radius and one at the center) is used to collect the acoustic data for a five vehicle convoy at the Aberdeen Proving Grounds. The acoustic data sampling rate is $F_s$=4410 Hz. The convoy consisted of two military Hummers and three commercial sports utility vehicles, traveling on gravel on an oval track. Detection and tracking of the commercial vehicles presented a difficult challenge because the commercial vehicles were in between the two louder military vehicles, hence they were acoustically suppressed. For this example, the center microphone is used as the RM whereas the other nine microphones are used as CM's. The array outputs bearing estimates every 0.5 seconds.

Figure 3A:
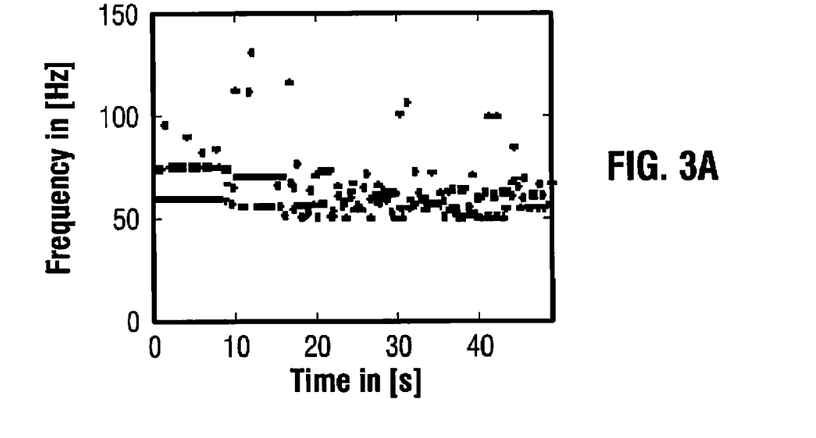
FIGS. 3(a)-(f) illustrate (a) Time-frequency plot of the received acoustic data. The circles indicate the strongest two frequencies in the data under the spatial aliasing frequency of 150 Hz. (b) Minimum variance distortionless response beamforming results on the two strongest frequencies shown in FIG. 3(a). The tracks are smooth with a small amount of clutter. (c) The wireless array results with L=15, each sent with 64 bits. The size of the dots is proportional to the value in the solution of θ. There is minimal clutter when compared to the adaptive beamforming results in FIG. 3(b). (d) The wireless array results with L=100, each sent with 1 bit (zero crossing). Note that the clutter has increased when compared to the results in FIG. 3(c). (e) The wireless array results with L=30, each sent with 1 bit (zero crossing). Note that the clutter has not increased too much when compared to the results in FIG. 3(d). (f) The wireless array results with L=10, each sent with 1 bit (zero crossing). The clutter has increased when compared to FIGS. 3(d) and 3(e); however, the bearing tracks are still clear.
Figure 3B:
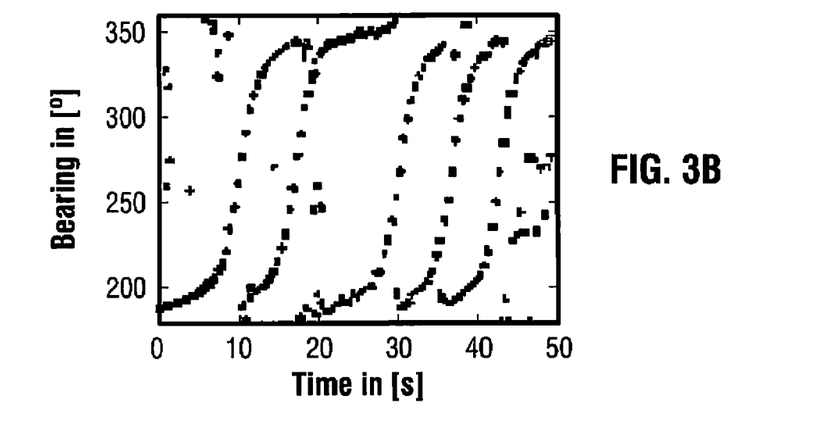

FIGS. 3(c)-(f) illustrate the wireless array bearing estimation results for different number of compressive samples L and quantization levels, and compare them with a frequency adaptive minimum variance distortionless response (MVDR) beamformer (FIGS. 3(a)-(b)), which uses all 10-microphone data collected at $F_s$. The MVDR beamformer uses the strongest two peaks in the time-frequency spectra of the received signal as shown in FIG. 3(a) and detects the three strongest peaks in the power versus angle pattern. The compressive wireless array uses N=360 and discretizes the bearing space uniformly into 1° resolution grid. For the relaxation variable $\epsilon$ in the convex optimization problem, $\epsilon=0.5\times\sqrt{\log N}=1.21$ is used. The wireless array results are reported under different test conditions below. In all the cases, a zero mean Gaussian noise with standard deviation 10 dB below the power of the compressive samples is also added to the compressive samples before quantization.

Figure 3C:
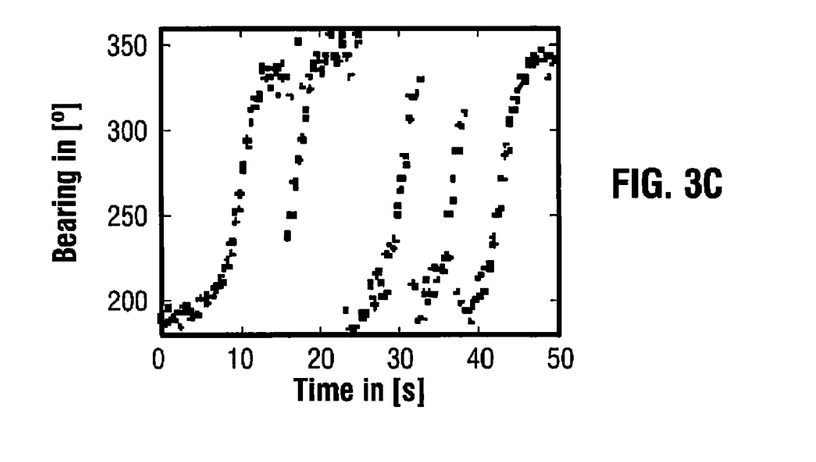
Figure 3D:
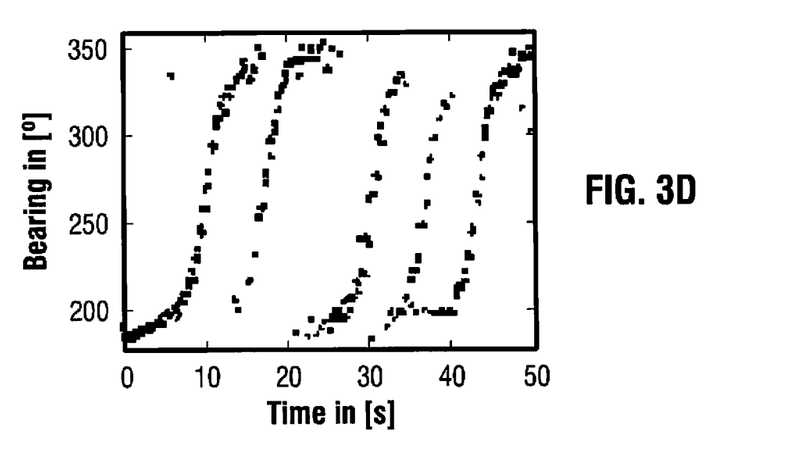
Figure 3E:
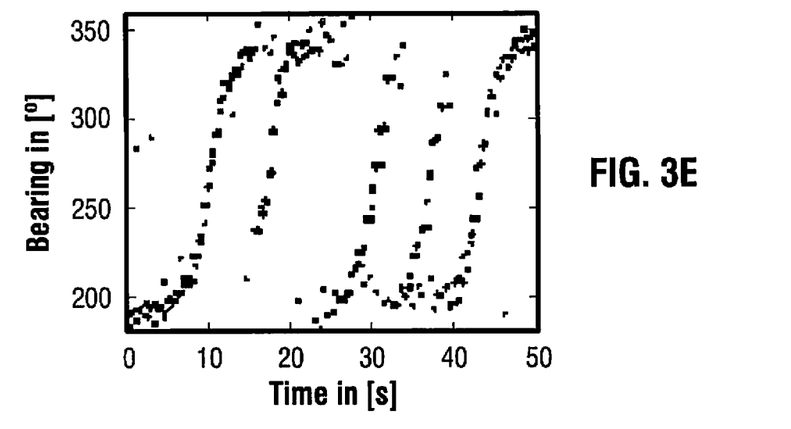
Figure 3F:
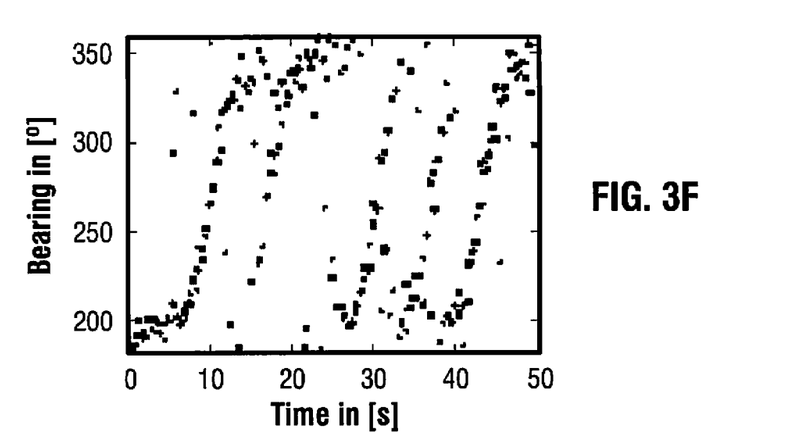

In FIG. 3(c), each CM sends 15 compressive samples, each encoded with 64 bits. Ignoring the losses of communication overheads and gains of coding schemes, this equates approximately 1000 bits/CM for nine CM's. FIG. 3(d) shows the results when the compressive samples L=100 with 1 bit quantization (zero crossing) are used. The total communication load in this case is 100 bits/CM. When the number of compressive samples is further decreased from L=30→10 with the same 1 bit quantization, corresponding to 30 bits/CM→10 bits/CM, it is observed a graceful decrease in the accuracy of bearing estimation and a moderate increase in the clutter. Even with the clutter, the results of the compressive wireless array are quite useful since a random sampling consensus (RANSAC) to approach can be used to track the targets.

4.2. Nulling Capabilities

Figure 4A:
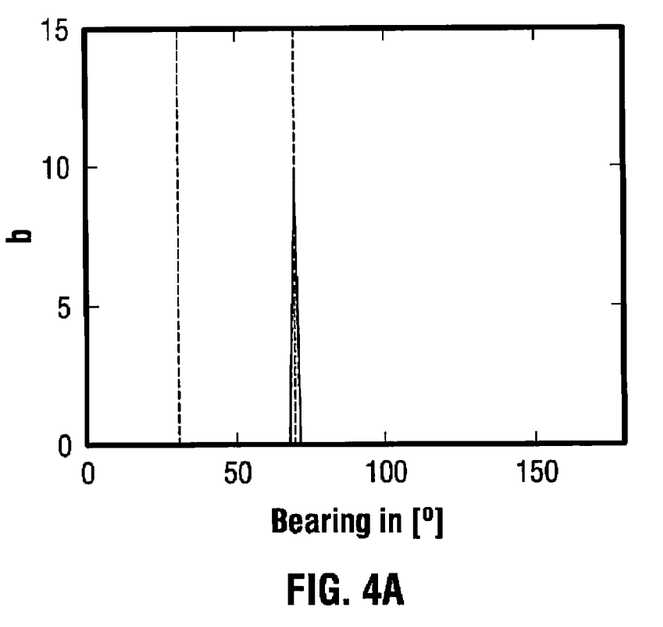
FIG. 4(a) illustrates before nulling the jammer.
Figure 4B:
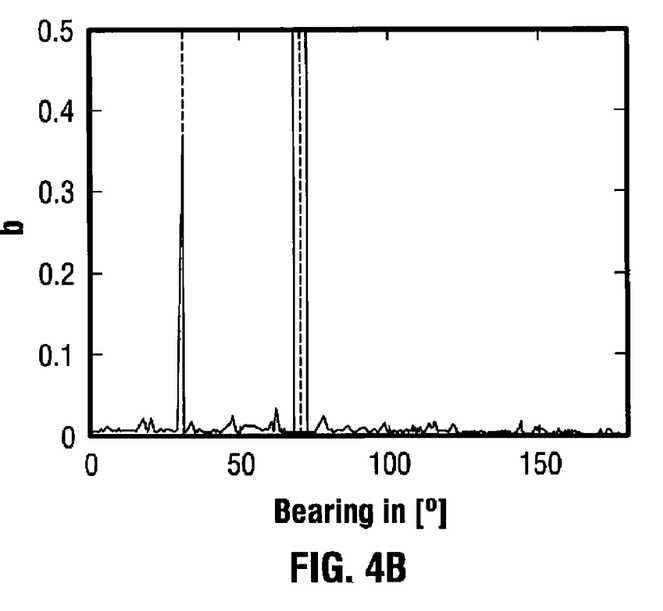
FIG. 4(b) illustrates after nulling the jammer.

The presented method has the capability of nulling a jammer and detecting a lower power target of interest in the presence of jammer. When the relative amplitudes of the jammer and the target are big, it is expected that the method according to the present disclosure only peaks the jammer and finds its bearing. When the jammer is nulled by removing the columns of $\Psi_i$ around the jammer angle, the lower power target of interest is capable of being detected. FIGS. 4(a) and 4(b) show beamforming results for the method according to the present disclosure before and after nulling the jammer, respectively. Two white noise sources which have a power ratio of five are put at 70° and 30° degrees. The high power source at 70° is called the jammer.

The result without nulling the jammer only shows the jammer in the solution. When the $\mp 2$ degrees is nulled around the jammer in the solution according to the present disclosure, the second result is obtained, where the source at 30 degrees comes out clearly. The experiments are repeated 100 times with new sources at each trial and the results are shown in FIG. 4.

4.3. Random Deployment Results

To demonstrate the immediate performance gains with the compressive wireless arrays, vehicle drive-by data was collected for six vehicles using a single microphone with $F_s$=4800 Hz. The vehicles and their relevant respective root-mean-squared (RMS) powers for the plots in this section are 1) Nissan Frontier (4.33), 2) Chevy Impala (4.33), 3) Chevy Camaro (4.03), 4) Isuzu Rodeo (2.84), 5) Volkswagen Passat (3.11), and 6) Honda Accord (4.60).

Figure 5A:
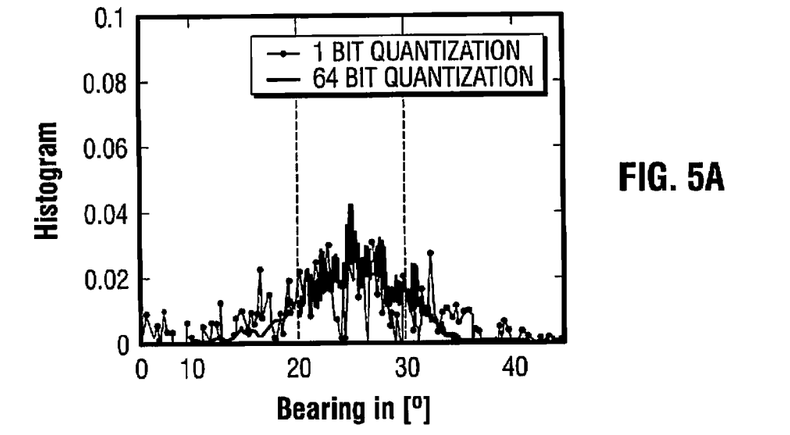
FIGS. 5(a)-(f) illustrate the aperture gain for different aperture sizes. (Top) Results with 1 bit quantization of the compressive (CM) outputs are marked with dots. (Bottom) Multiple source bearing estimation results for random deployment. The true source bearings are shown with the dashed vertical lines.
Figure 5B:
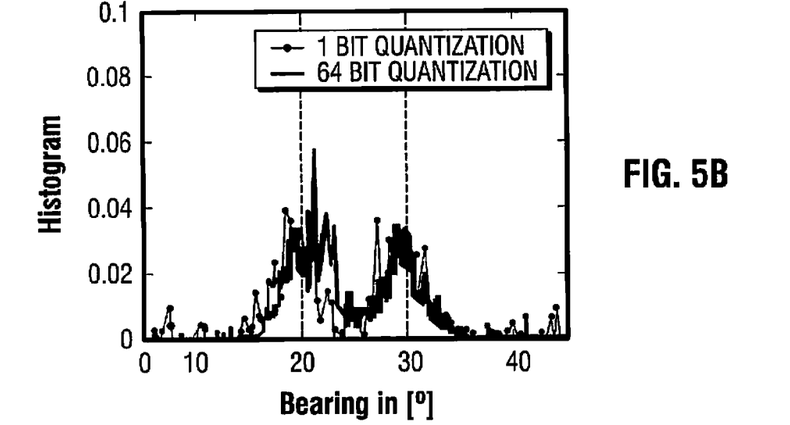
Figure 5C:
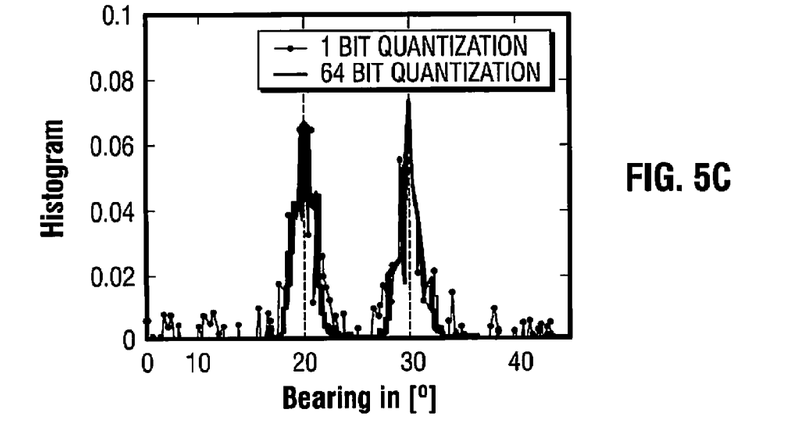

Aperture Gains: To show the aperture gains from the compressive wireless arrays, three scenarios were simulated illustrated in FIGS. 5(a)-(c). In FIGS. 5(a)-(c), nine CMs were used and randomly deployed in 1×1 m², 2×2 m², and 5×5 m² aperture, and then added an RM at the center. 0.5 seconds of the vehicle data was then used for vehicles #2 and #6 and the array data was simulated by placing the sources at 20° and 30° (both at 40 m) range by properly delaying each acoustic source by its distance to the microphones (c=340 m/s). By using L=15 compressive samples, the sparse θ for 100 independent Monte Carlo runs was determined, where the individual CM positions vary. The average of the runs was then plotted, which creates illustrative histograms seen in FIGS. 5(a)-(c). In the figures, it is also shown when the estimation is done with 1 bit quantization. Similar to the previous section, a zero mean Gaussian noise with standard deviation 10 dB below the power of the compressive samples is also added to the compressive samples before quantization.

It is clear that as the aperture size increases with the same number of sensors, the bearing resolution of the arrays increase, allowing the two targets to be separated. This separation is even clear, when only 1 bit is used for each compressive sample in spite of the additional clutter. Since the compressive wireless arrays are by design untethered, a random deployment strategy can be used to distribute them over larger apertures than the ones conventionally used for UGS'es. Hence, they are envisioned to perform better than conventional tethered arrays. Finally, it is also interesting to note that the height of the histograms in FIGS. 5(b)-(c), which give clues about the relative source RMS powers 4.33 and 4.60, respectively. Also, their shape resembles the Laplacian distribution as opposed to the Gaussian distribution.

Figure 5D:
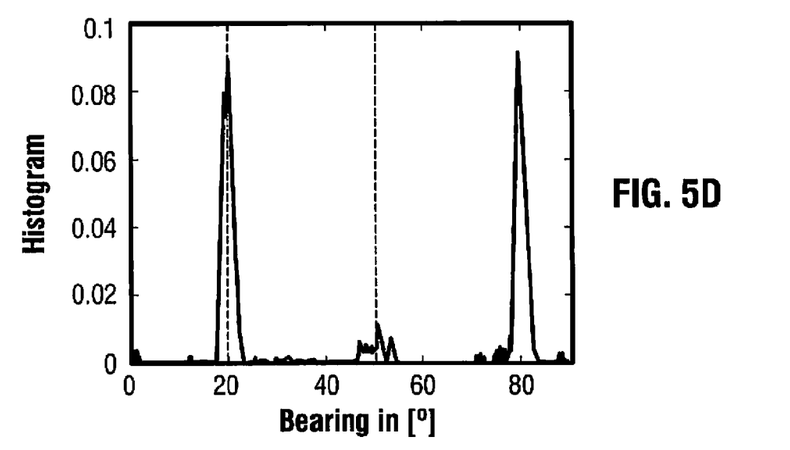
Figure 5E:
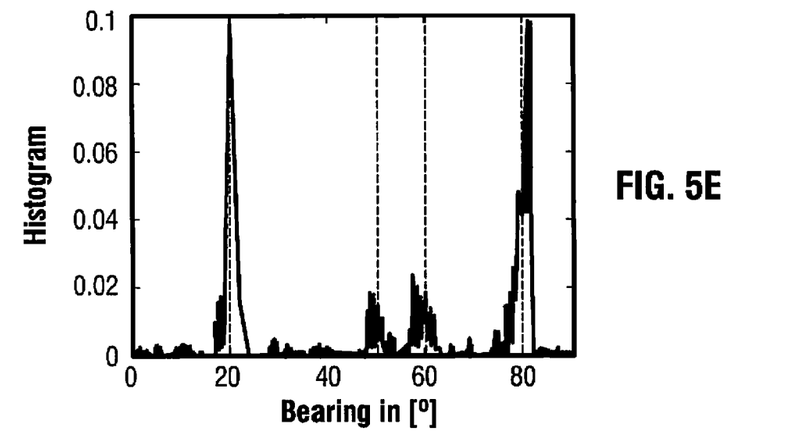
Figure 5F:
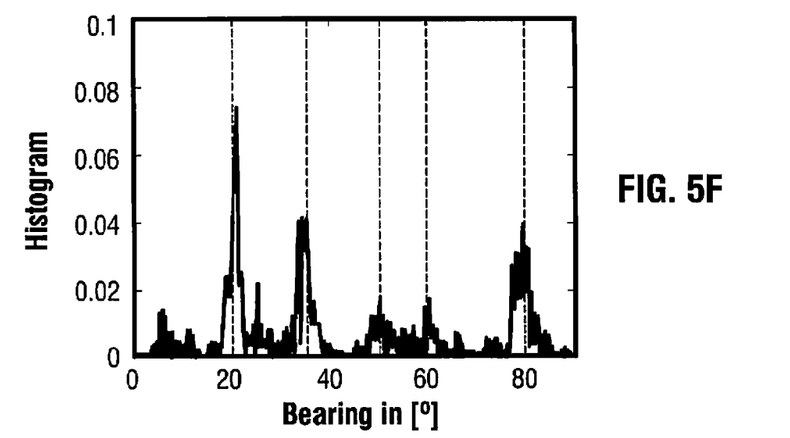

Multiple Source Localization: To demonstrate the steering capabilities of the formulation, three scenarios were simulated which are illustrated in FIGS. 5(d)-(f), where the total number of targets is varied from 3 to 5 (all at 40 m range). In FIGS. 5(d)-(f), target configurations {#1. #3. #5}, {#1, #3, #4, #5}, and {#1. #2, #3, #4, #5} were used, respectively, and plot the θ histograms for 100 independent Monte Carlo realizations of the random sensor deployment on a 5×5 m² aperture with L=15. The target bearings are given by {20°, 35°, 50°, 60°, 80°}, respectively. Similar to the previous section, a zero mean Gaussian noise with standard deviation 10 dB below the power of the compressive samples is also added to the compressive samples before quantization. As the number of targets increase, there is a gradual increase in clutter peaks; however, the results are still encouraging even at 5 targets that are close in bearing. The height of the histograms seems to be related to the relative source RMS powers.

The technology according to the present disclosure is expected to find significant demand in wireless bearing estimation, acoustic sensor networks, and remote sensing applications. Other areas include radar and defense industries.

5. Conclusions

The feasibility of a wireless acoustic array is demonstrated to estimate multiple source bearings by passing quantized compressive sensing data among the sensors. In the solution described herein, the sparsity of the sources is exploited in the angle domain and their sparsity pattern is obtained, which determines the number of targets and their corresponding bearings. Since the compressive samples are the minimum number of data samples required to reconstruct the bearing vector in the angle domain, the approach according to the present disclosure uses minimum possible communication bandwidth among the sensors. It is also shown herein there is a significant redundancy in the individual data of the sensors for the acoustic bearing estimation problem. This is accomplished by demonstrating that the wireless array scheme described herein is quite robust against noise in the compressive samples and can even operate when only the zero crossing information of the compressive samples is passed, which cannot be used to recover the data of the sensors.

All computations described herein are performed by at least one processor which can be provided within one or more of the sensors and/or one or more computing devices, such as a personal computer, handheld computing device, PDA, etc., and in operative communication with the sensors.

The described embodiments of the present disclosure are intended to be illustrative rather than restrictive, and are not intended to represent every embodiment of the present disclosure. Various modifications and variations can be made without departing from the spirit or scope of the disclosure as set forth in the following claims both literally and in equivalents recognized in law.

What is claimed is:

1. A method for bearing estimation of multiple acoustic sources, said method comprising:
    providing a wireless sensor array having a plurality of sensors capable of communicating with each other via a communication channel;
    forming an array steering matrix for multiple sparse sources in an angle domain for bearing estimation, wherein each of the multiple sparse sources corresponds to a respective acoustic source of the multiple acoustic sources; and
    calculating multiple target bearings corresponding to the multiple acoustic sources using random projections of signals within the wireless sensor array and corresponding to the multiple sparse sources, wherein said signals are sensed by the plurality of sensors of the wireless array.

2. The method according to claim 1, wherein the random projections of the signals constitute compressive samples of the multiple target bearings.

3. The method according to claim 1, wherein the random projections of the signals from the multiple sensors are used to calculate the multiple target bearings without any auxiliary signal reconstruction of the signals.

4. The method according to claim 1, wherein the location of each of said plurality of sensors is known a priori.

5. The method according to claim 1, wherein the plurality of sensors are located on a ground plane.

6. The method according to claim 1, further comprising obtaining recovery of the multiple sparse sources from under-sampled data by using a Nyquist-Shannon sampling theorem.

7. The method according to claim 1, further comprising:
    modeling the multiple target bearings as a sparse vector in the angle domain; and
    applying a polynomial time sparse recovery algorithm to a combinatorial optimization problem to obtain multiple source bearings corresponding to the multiple acoustic sources.

8. The method according to claim 1, wherein the communication channel is under bandwidth constraints.

9. The method according to claim 1, wherein one sensor of the plurality of sensors acquires a reference signal and the other sensors of the plurality of sensors perform compressive sensing.

10. The method according to claim 9, wherein the sensor acquires the reference signal at a Nyquist sampling rate.

11. The method according to claim 9, further comprising relating the compressive sensing measurements of the other sensors as a linear function of a vector of discretized angles spanning the angle domain.

12. The method according to claim 1, wherein the communication channel is a wireless communication channel.

13. A system for bearing estimation of multiple acoustic sources, said system comprising:
    a wireless sensor array having a plurality of sensors capable of communicating with each other via a communication channel;
    means for forming an array steering matrix for multiple sparse sources in an angle domain for bearing estimation, wherein each of the multiple sparse sources corresponds to a respective acoustic source of the multiple acoustic sources; and
    means for calculating multiple target bearings corresponding to the multiple acoustic sources using random projections of signals within the wireless array and corresponding to the multiple sparse sources, wherein said signals are sensed by the plurality of sensors of the wireless array.

14. The system according to claim 13, wherein the location of each of said plurality of sensors is known a priori.

15. The system according to claim 13, wherein the plurality of sensors are located on a ground plane.

16. The system according to claim 13, further comprising means for obtaining recovery of the multiple sparse sources from under-sampled data by using a Nyquist-Shannon sampling theorem.

17. The system according to claim 13, further comprising:
    means for modeling the multiple target bearings as a sparse vector in the angle domain; and
    means for applying a polynomial time sparse recovery algorithm to a combinatorial optimization problem to obtain multiple source bearings corresponding to the multiple acoustic sources.

18. The system according to claim 13, wherein the communication channel is under bandwidth constraints.

19. The system according to claim 13, wherein one sensor of the plurality of sensors acquires a reference signal and the other sensors of the plurality of sensors perform compressive sensing.

20. The system according to claim 19, wherein the sensor acquires the reference signal at a Nyquist sampling rate.

21. The system according to claim 19, further comprising relating the compressive sensing measurements of the other sensors as a linear function of a vector of discretized angles spanning the angle domain.

22. The system according to claim 13, wherein the communication channel is a wireless communication channel.

* * * * *